United States Patent [19]

Apellaniz

[11] Patent Number: 4,501,259

[45] Date of Patent: Feb. 26, 1985

[54] DEVICE FOR HEATING FOOD CONTAINED IN A SEALED CONTAINER

[75] Inventor: Ramon Apellaniz, Lasne, Belgium

[73] Assignee: Tarahelm Limited, London, Great Britain

[21] Appl. No.: 450,695

[22] Filed: Dec. 17, 1982

[30] Foreign Application Priority Data

Dec. 18, 1981 [LU] Luxembourg .............. 83844

[51] Int. Cl.³ ................................. F24J 1/00
[52] U.S. Cl. ................................. 126/263; 426/113; 44/3 R; 252/70
[58] Field of Search .............. 126/263; 206/219, 220, 206/221, 222; 426/109, 113, 114; 44/3 R; 252/67, 70, 188.3 R

[56] References Cited

U.S. PATENT DOCUMENTS

| | | | |
|---|---|---|---|
| 1,971,364 | 8/1934 | Zimmer et al. | 126/263 |
| 2,212,441 | 8/1940 | Katz | 126/263 |
| 2,482,779 | 9/1949 | Katz | 126/263 |
| 2,553,878 | 5/1951 | Steven | 126/263 |
| 2,579,405 | 12/1951 | Sukacev | 126/263 |
| 2,613,664 | 10/1952 | Rivoche | 126/263 |
| 2,968,932 | 1/1961 | Vance et al. | 126/263 X |
| 3,429,672 | 2/1969 | Young | 44/3 R |
| 3,871,357 | 3/1975 | Grosso et al. | 126/263 |
| 3,903,011 | 9/1975 | Donnelly | 126/263 X |
| 4,002,235 | 1/1977 | Donnelly | 126/263 X |
| 4,265,216 | 5/1981 | Marshall et al. | 126/263 |

FOREIGN PATENT DOCUMENTS 495217 11/1938 United Kingdom .............. 126/263

Primary Examiner—Margaret A. Focarino
Attorney, Agent, or Firm—Sughrue, Mion, Zinn, Macpeak and Seas

[57] ABSTRACT

This invention relates to a device for heating food contained in a sealed container, such as a tin, can or carton, without use of external heat.

The device comprises at least one sealed container surrounded by an envelope forming an annular chamber containing quicklime and water separated by a wall which can be easily pierced or torn, so as to allow a contact of the water with the quicklime, said annular chamber containing quicklime the reactivity of which has been previously reduced, as well as an amount of water which is larger than the amount necessary for the hydration reaction of the quicklime. The reactivity of the quicklime has been reduced by calcination at a temperature of more than about 900° C. and preferably comprised between about 1100 and 1400° C. according to the desired reactivity degree. The amount of water contained in the annular chamber surrounding the sealed container is comprised between about 0.75 and 3 parts by weight for 1 part by weight of quicklime.

The water necessary for the exothermic reaction with the quicklime having a reduced reactivity is contained in a sealed annular bag which can be easily torn or pierced, said bag being placed above quicklime grains.

1 Claim, 3 Drawing Figures

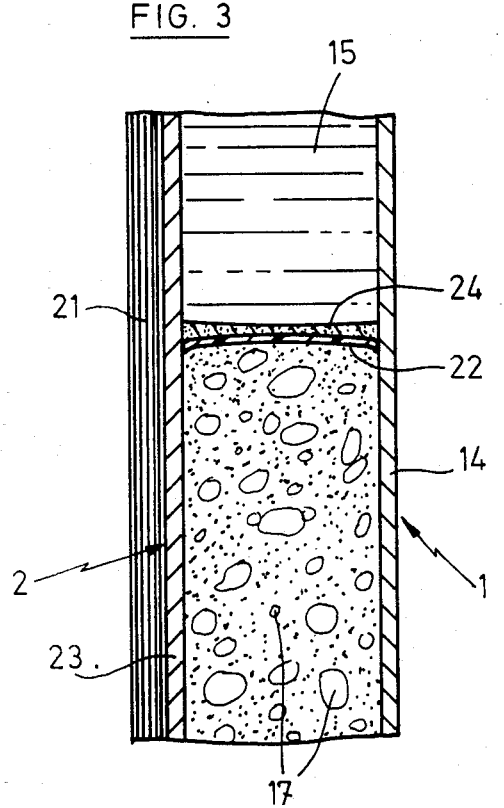

DEVICE FOR HEATING FOOD CONTAINED IN A SEALED CONTAINER

PRIOR ART

It is known to place around a food-containing tin or can an envelope defining an annular chamber, in which water and quicklime are introduced. The quicklime is separated from the water by a watertight wall or membrane, which can be pierced or torn by any mechanical means, so as to allow the water to come into contact with the quicklime. The reaction between water and quicklime is exothermic. The heat produced by the slaking reaction of the quicklime is transferred by conduction to the food contained in the tin box or can.

The above known system has several drawbacks.

The quicklime is too reactive with the water and the heat produced by the slaking reaction is released too quickly, so that the transfer of reaction heat to the food contained in the box is not complete, an important amount of heat being lost.

Moreover, the quicklime which is a very hygroscopic material is not maintained in a sufficiently tight space. Therefore, the contact of the quicklime with the humidity of the air damages the quicklime and reduces the heating capacity of the latter.

Moreover, the mixture of the quicklime with water is not homogeneous, so that a strong heating occurs at some places. This strong heating causes the release of an important amount of water vapour, which causes a heat loss and an increase of pressure which may cause explosions. In other places, the water does not reach the quicklime, so that part of the heating material remains unused.

Another drawback of the known systems is due to the fact that the hydrated lime produced by the reaction of quicklime with water is a poor heat conducting material. Therefore, the heating of the food contained in the tin is slow and the known systems use large amounts of quicklime for compensating the lime losses.

The already known proposed systems are also expensive, since the use of these systems is complex and needs pieces and machines that the tin or can manufacturers do not possess. The cost for carrying out the known systems is therefore prohibitive.

BRIEF DESCRIPTION OF THE INVENTION

An object of this invention is a device which does not have the drawbacks of the known systems.

This invention relates to a device comprising a sealed container such as a tin or can surrounded by an envelope forming an annular chamber containing quicklime and water separated by a wall which can be easily perforated or teared, this device being essentially characterized by the fact that it contains quicklime the reactivity of which has been previously reduced, as well as an amount of water in excess with respect to the amount necessary for hydrating the quicklime.

According to a feature of the invention, the annular chamber contains quicklime, the reactivity of which has been decreased by calcination at a temperature of more than about 900° C., preferably at a temperature comprised between about 1100° and 1400° C. according to the desired reactivity degree. This thermal treatment causes not only a moderation of the reactivity of the quicklime with water, but also an increase of the apparent volume mass of the quicklime.

These properties of the quicklime are advantageous since they allow a progressive slaking reaction and therefore a good transmission of the reaction heat by conduction to the food contained in the tin or sealed box. On the other hand, the increased apparent volume mass of the quicklime enables the introduction in the annular chamber of a larger amount of quicklime per volume unit.

The reactivity of the quicklime, defined by the temperature and duration of the calcination of said lime, is adjusted in accordance with the nature of the food to be heated and in accordance with the desired heating degree and duration.

According to another feature of the invention, the amount of water contained in the annular chamber surrounding the tin or sealed container is comprised between 0.75 and 3 parts by weight per part by weight of quicklime.

Due to the large excess of water with respect to the stoichiometric amount which is necessary for slaking the quicklime, it is possible to obtain a mixture of water and lime which is sufficiently moist for obtaining a good transmission of the reaction heat to the food contained in the tin box. Moreover, due to said excess of water, the formation of water vapour which would cause a heat loss is substantially avoided.

According to another feature of the invention, the quicklime consisting essentially of calcium oxide grains is placed on the bottom of the annular chamber, so that the water mass located above the lime can be uniformly distributed within the mass of quicklime before the hydration reaction starts, when the water is released by tearing or piercing the wall separating the water from the quicklime.

According to still another feature of the invention, the envelope forming the annular chamber surrounding the tin or sealed container consists of a box which is coaxial to said tin and is open at one end, where the space between the free edge of the open box and the adjacent edge of the tin is tightly closed by an annular closure piece made of a piercable material. The annular closing piece if preferably a flat ring having edges which are attached, preferably by crimping, to the free edge of the open box and to the corresponding edge of the food-containing tin box. The flat ring may be made of a thin or light metal or of plastic.

The water needed for slaking the quicklime is advantageously contained in a waterproof container or bag made of plastic (such as polyethylene) or another flexible material and having an annular shape, said water container or bag, which can be easily perforated or teared being located above the quicklime grains.

The use of a flexible and easily piercable water-containing annular bag above the mass of quicklime grains is advantageous since it allows an easy flow of the water, by gravity, into the whole mass of quicklime grains, when said bag has been pierced and since, due to its flexibility, the empty bag allows an expansion of the lime during the slaking thereof, without danger of deformation or breaking of the envelope or of the tin. When the water has been removed from the bag under gravity, said bag becomes shrivelled and leaves a free space available for the expansion of the lime mass during the hydration reaction thereof. The flexible water-containing bag can easily be placed in the upper part of the annular chamber surrounding the tin or sealed container.

Instead of using a flexible water bag for separating the water from the quicklime grains, it is possible, in accordance with this invention, to use merely an annular thin waterproof strip or membrane of plastic or another flexible material, which is glued or welded to the inner wall of the outer box and to the outer wall of the tin by means of a sealing material, so as to form a tight joint with said walls. Said sealing material is preferably of such a type that it is damaged or melts when heated. The sealing material may be made of a polymer having a melting point comprised preferably between about 70° and 100° C., so that when the thin membrane is pierced or torn and when the water is allowed to flow into the quicklime grains, the heat created by the slaking of the quicklime causes the melting of the sealing material, whereby the lime becomes free to expand. Microcrystalline waxes having a low melting point or a hot-melt glue made of a copolymer of ethylene and vinyl acetate may, for example, be used as sealing material for binding or welding tightly the thin annular membrane to the walls of the inner and outer boxes in the annular chamber between these two boxes.

According to the invention, the envelope of the sealed container or tin may be heat insulated by means of a layer of a heat insulating material on the outer or inner face of said envelope. Due to such an insulating layer, the envelope can be easily gripped and the heat losses through said envelope are kept to a minimum.

DETAILED DESCRIPTION OF THE INVENTION

Other features and details of the invention will appear from the following detailed description in which reference is made to the attached drawings, in which:

FIG. 3 is a partial cross-section showing another embodiment of the separation between the water and the quicklime grains in the annular chamber surrounding the conserve tin box.

Figure 2:
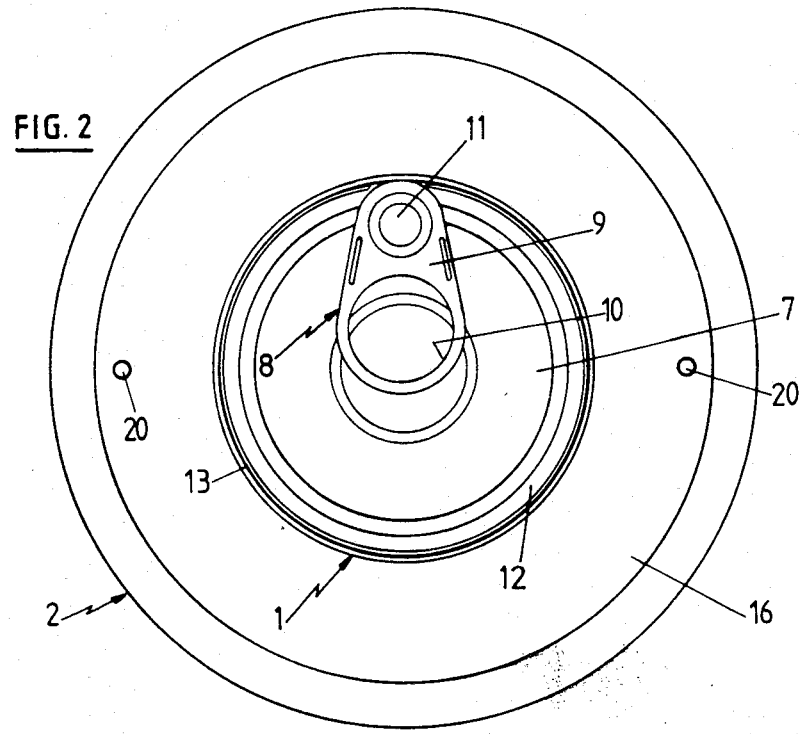
FIG. 2 is a plan view in the direction of arrow Y in FIG. 1.
Figure 1:
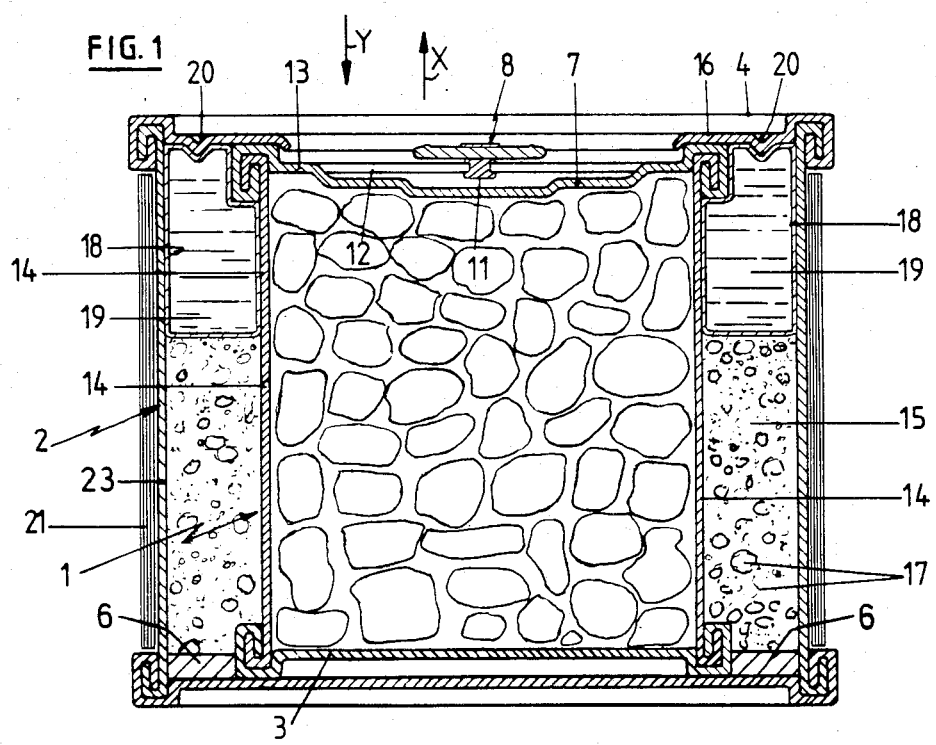
FIG. 1 is a cross-section of a self-heating box or tin according to this invention.

In FIGS. 1 and 2, reference 1 designates a cylindrical tin or can, which is tightly closed and contains any food to be heated before its consumption. Said tin 1 may contain any food, such as vegetables, meat, soup and the like. The tin 1 is placed in an envelope 2 having the shape of a cylindrical bag which has a closed bottom 3 and is open at its opposite end 4. The envelope 2 is coaxial to the tin 1, the bottom 5 of which is centered on the bottom 3 of the outer box 2 by means of a centering ring 6. At the opposite end 7, the tin 1 is provided with a known opening device 8. This device 8 comprises a tongue 9 provided with an eyelet 10 and with a part 11 which is attached to the wall 12 closing said opposite end 7 of the inner tin 1. When the tongue 9 is pulled by hand in the direction of the arrow X, the wall 12 of the tin 1 teares along a circular line of small resistance shown by the thinned part 13 of the wall 12. The tin 1 may thus be opened by means of this known device 8, without the need of using a special opening tool, so that the content of the tin can be consumed or removed therefrom.

Between the envelope 2 and the side wall 14 of the tin 1, there is an annular chamber 15 which is closed, on the side adjacent to the end 7 of the tin 1, by an annular strip 16 which may, for example, be made of an easily pierceable material, such as a metal thin sheet. One edge of the annular strip 16 is crimped to the free edge (opposite the closed bottom 3) of the envelope 2, whereas the other edge of said annular strip 16 is also crimped to the end of the side wall 14 of the inner box 1, which is adjacent to its end 7. Said annular strip 16 closes tightly the annular chamber 15 which contains the reagents necessary for the exothermic reaction used for heating the content of the tin 1.

A mass of quicklime grains 17, the reactivity of which has been moderated by thermal treatment at a temperature of more than about 900° C., is placed in the lower part of the annular chamber 15. Above said mass of quicklime 17, the annular chamber 15 contains a preferably tore-shaped bag 18 containing water 19 in excess with respect to the stoichiometrically necessary amount for the slaking of the quicklime. The bag 18 is preferably made of a very flexible plastic, such as, for example, polyethylene. The flexible bag 18 preferably contains water under pressure so that, when the bag is pierced by means of a pointed tool (not shown), for example through two thinned parts 20 of the annular strip 16, the water is expelled from said bag 18 and flows quickly, by gravity, into the whole mass of quicklime 17 located under said bag 18, before the hydration reaction of the quicklime may practically start.

The outer face of the envelope 2 may be provided with a heat-insulating layer 21 made for example of polystyrene foam.

Instead of using a bag 18, the water-containing space of the annular chamber 15 may be separated from the space containing the quicklime grains 17 by a device shown in FIG. 3. This device comprises a thin annular flat strip or membrane 22 which may be made of a flexible plastic, such as polyethylene. This strip 22 is sealed to the side wall 14 of the inner box 1 and to the side wall 23 of the envelope 2 by means of a sealing layer 24. This layer 24 may be obtained by pouring a small amount of a molten polymer or wax on the strip 22 and by allowing this layer to cure or harden so as to form a waterproof barrier on top of the strip 22. The sealing agent may be, for example, a microcrystalline wax or a copolymer of ethylene and vinyl acetate having a melting point comprised between about 70° and 100° C.

When the strip 22 and the sealing layer 24 are pierced by means of a tool, water flows into the mass of quicklime grains 17 and, due to the reaction heat, the layer 24 melts, so that the strip 22 is no more sealed to the side walls 14 and 23 of the box 1 and of the envelope 2 and the remaining fraction of water flows freely into the mass of quicklime grains 17. Due to the melting of the sealing layer 24, the strip 22 becomes loose and the lime is able to expand freely in the annular chamber 14.

EXAMPLE

The following example illustrates the invention.

A tin 1 of the type shown in FIGS. 1 and 2 containing 800 grams of sausage and 350 grams of water has been coaxially placed into an outer metal envelope or box 2, the outer face of which was insulated by means of a layer of polystyrene foam of a thickness of 3 mm. The annular chamber 15 between the two boxes 1, 2 had a volume of 450 cm$^3$. 200 grams of quicklime grains having a particle size of 2 to 5 mm have been introduced into said annular chamber 15. This quicklime had previously been calcinated at a temperature of 1200° C. during 2 hours. This thermal treatment has given a moderate reactivity to the quicklime, so as to allow a progressive release of the hydration heat during about 10 minutes. Above the quicklime mass, 200 cm³ of water contained in a flexible plastic bag 18 have been introduced into the annular chamber 15 so as to fill completely the remaining volume of this chamber. The annular chamber 15 has been tightly closed by means of a ring-shaped strip which has been crimped to the two boxes so as to obtain a rigid assembly.

The initial temperature of the tinned or canned food was of 20° C.

The annular strip 16 and the bag 18 have been pierced by means of a needle in two places 20.

After a few minutes, the slaking reaction started, so as to heat the water in contact with the lime. Under these circumstances, the food contained in the tin 1 was heated by conduction through the metal side wall of said tin 1.

The slaking reaction of the lime was progressive and moderate. A very small amount of water vapour was released through the holes pierced in the annular strip 16.

Ten minutes after the piercing of the annular strip 16, the temperature of the sausage was of 60° C. After 15 minutes, the temperature was of 63° C. and after 40 minutes the temperature was still of 58° C. This small decrease of temperature was due to the outer insulation of the box and to the moist and warm mass of lime surrounding the tin 1.

ADVANTAGES OF THE DEVICE ACCORDING TO THE INVENTION

The device for heating a tin according to this invention can heat easily, quickly and safely the food at the desired consumption temperature. This is due to the original conception of the device which is quite cheap.

The device according to the invention may be used by consumers having activities in open air, such as campers or persons traveling with a caravan, by railroad, aircraft, ship or road. It can also be used by alpinists, by the army and by persons having an activity in open air and having no canteen or being in a place where fire is not permitted.

The device according to the invention hase several advantages both for the consumer and for the manufacturer.

For the consumer, the device according to the invention may be used for eating or drinking anywhere in an independent, practical and economical manner, without need of other tools than a piercing tool and possibly a fork and/or spoon. The food to be consumed may be heated quickly, i.e. within a few minutes, without watching the heating. Due to the use of a quicklime having a moderate reactivity, which is adjusted in accordance with the particular food to be heated, there is no risk of excess cooking, whereas the heat insulation of the envelope maintains the food at the desired temperature during a long period of time. The device according to the invention is absolutely safe, due to the use of non toxic products and of solid materials which are resistant to shocks which may occur during the transportation and handling of the device.

For the box manufacturer, the system according to this invention opens a new market which offers to the consumers a device of a low cost price, due to the easy manufacture of the device and the cheapness of the packing and of the starting materials, namely the heating materials. The device according to this invention has also the advantage of a large flexibility for the manufacturer of tins or cans. Since the heating means are independent from the tin, the manufacturer can easily take from the manufacture lines tins or cans to be equipped with the self-heating system, in accordance with the requirements. The tin provided with its envelope may be decorated, for example labeled, in the same manner as a usual tin or can.

The device according to this invention does not create pollution problems after its use. It can be incinerated, ground or spread out in accordance with the usual techniques for the treatment of wastes.

I claim:

1. In a process for heating food contained in a sealed container surrounded by an envelope forming an outer chamber containing quicklime and water separated by a wall which can be easily pierced or torn, the improvement comprising reacting, after piercing said wall, grains of quicklime, the reactivity of which has been previously reduced by overburning at a termperature of 1100° to 1400° C., with an amount of water which is larger than the amount necessary for the hydration or slaking reaction of the quicklime, said amount of water being comprised between about 0.75 and 3 parts by weight for 1 part by weight of quicklime grains.

* * * * *